United States Patent [19]

Salatin et al.

[11] Patent Number: 4,791,168

[45] Date of Patent: Dec. 13, 1988

[54] POLYURETHANE RESINS IN WATER-DILUTABLE BASECOATS HAVING LOW FLASH AND QUICK-DRYING CHARACTERISTICS

[75] Inventors: Timothy Salatin, Farmington Hills; Thomas C. Balch, West Bloomfield; Michael C. Knight, Center Line; Michael D. Shesterkin, Oak Park; John S. Van Antwerp, Royal Oak; Paul E. Lamberty, Romeo; Robert A. Aamodt, Farmington Hills, all of Mich.

[73] Assignee: BASF Corporation, Inmont Division, Clifton, N.J.

[21] Appl. No.: 38,385

[22] Filed: Apr. 15, 1987

[51] Int. Cl.$^4$ .................. C09D 3/52; C09D 3/72
[52] U.S. Cl. .................. 524/601; 427/407.1; 427/409; 427/412.1; 427/412.3; 427/426; 428/458; 524/602; 525/440; 525/444.5; 528/288; 528/295.3; 528/296; 528/302
[58] Field of Search .................. 427/407.1, 409, 412.1, 427/412.3, 426; 428/458; 524/601, 602; 525/440, 444.5; 528/288, 295.3, 296, 302

[56] References Cited

U.S. PATENT DOCUMENTS

| | | | |
|---|---|---|---|
| 4,423,179 | 12/1983 | Guagliardo | 524/539 |
| 4,489,135 | 12/1984 | Drexler et al. | 428/423.1 |
| 4,529,632 | 7/1985 | Fujii et al. | 427/409 |
| 4,533,703 | 8/1985 | Kordomenos et al. | 525/440 |
| 4,562,232 | 12/1985 | Smith | 525/444.5 |
| 4,576,868 | 3/1986 | Poth et al. | 428/423.1 |
| 4,582,895 | 4/1986 | Peerman et al. | 528/295.3 |
| 4,620,994 | 11/1986 | Suss et al. | 427/407.1 |

*Primary Examiner*—Morton Foelak
*Assistant Examiner*—S. A. Acquah
*Attorney, Agent, or Firm*—Kenyon & Kenyon

[57] ABSTRACT

This invention, therefore, relates to the field of polyurethane coatings for use in automobile basecoat/clearcoat systems. In particular, this invention relates to the discovery that incorporating a long-chain carboxylic acid of at least 50% by weight of the carboxylic acid component used to make polyester resins which are further incorporated into polyurethane resins provides basecoat composition exhibiting low temperature flash characteristics. These low temperature flash characteristics are exhibited even where the basecoat is deposited at 50–90% relative humidity.

55 Claims, No Drawings

POLYURETHANE RESINS IN WATER-DILUTABLE BASECOATS HAVING LOW FLASH AND QUICK-DRYING CHARACTERISTICS

BACKGROUND OF THE INVENTION

Multi-layer systems have been utilized to coat automobiles for a number of years, but the early development of these systems necessarily employed organic solvents. As environmental regulations became more stringent, and the cost or organic solvents rose, organic-borne basecoat systems became less desirable. The recent research emphasis in the area of multi-layer systems, especially basecoat systems has focused on the development of water-borne systems for multi-layer coatings.

The shift from organic solvents to water for dispersing and applying resins in multi-layer systems solved many of the environmental and cost problems associated with the use of organic solvents. Water-borne systems, however, have resulted in other problems.

The application of a multi-layer coating to an automobile body, for example, would be greatly facilitated by a system that provides for quick-drying of solvent during and after the application of a coating. These quick-drying characteristics enhance a broad application window and allow minimal control of relative humidity and temperature in the spray zone, resulting in lower energy costs. By facilitating drying, the time between coatings would be diminished, resulting in greater manufacturing efficiencies and lower energy costs. In addition, there would be no need for a cooldown zone after drying which would further the manufacturing efficiencies. Low boiling organic solvents were originally used in multi-layer coatings to take advantage of their quick-drying features. With the introduction of aqueous based multi-layer systems, the drying of water from a given resin coating after application became a problem. It was desired to produce a basecoat composition that could be dried in a period of time short enough to maintain manufacturing efficiency.

The present invention is directed to polyurethane coatings to be used in formulating basecoat compositions of multi-layer coating systems. The resins of this invention are shown to possess the qualities of being quick-drying during and after application. Furthermore, the resins of this invention also exhibit superior coating characteristics, for example, good metallic effects such as very favorable arrangement, fixation, and flip effect of the metallic pigments in the paint film. When non-metallic pigments are used, the resins of the present invention exhibit excellent decorative effect.

This invention, therefore, relates to the field of polyurethane coatings for use in automobile basecoat/clearcoat systems. In particular, this invention relates to the discovery that incorporating a long-chain carboxylic acid of at least 50% by weight of the carboxylic acid component used to make polyester resins which are further incorporated into polyurethane resins provides basecoat compositions exhibiting low temperature flash characteristics. These low temperature flash characteristics are exhibited even where the basecoats are deposited at 50-90% relative humidity.

The polyurethane resin, produced by the reaction of the above-described polyester resin and a polyisocyanate mixture, although useful as a coating composition for a number of substrates of especially useful as a basecoat for automobiles. Coatings containing polyurethanes synthesized from polyesters with a long chain fatty acid comprising at least about 50% of the acid component in the polyester resin have shown to be particularly useful for water-borne basecoat compositions used in multi-layer systems.

It is an object of this invention to provide polyurethane resins that can be incorporated into basecoat formulations to provide low flash and quick-drying characteristics.

It is an additional object of this invention to provide polyester resins which can provide favorable low flash and quick-drying characteristics to polyurethane resins.

It is a further object of this invention to provide water-borne basecoat compositions having favorable coating and cosmetic characteristics and additionally provide for manufacturing efficiencies which result from the low-flash, quick-drying characteristics.

It is also an object of this invention to provide a method of producing the resins and basecoat compositions described herein.

It is a further object of this invention to provide a method for coating a metallic or plastic substrate utilizing the resins and basecoat formulations of the present invention.

These and other objects of the present invention are furthered by incorporating polyurethane resins into basecoat formulations.

SUMMARY OF THE INVENTION

The polyurethane resins are comprised of, in part, polyester resins formed from a carboxylic acid component and a alcohol having at least 2 hydroxyl moeities. Specifically, this invention relates to an anionic polyurethane coating composition comprised of:

1. A polyester component produced by condensing a carboxylic acid component with alcohols having at least 2 hydroxy moeities wherein the carboxylic acid component is comprised of at least about 50% by weight of a long chain hydrophobic carboxylic acid containing compound having between 18 to 60 carbon atoms; and 2. A mixture of a compound having at least 2 isocyanate groups, a multi-functional compound having at least one active hydrogen functionality and at least one carboxylic acid functionality and optionally, a compound having at least two active hydrogen groups, for example, diols, dithiols, diamines, or compounds having mixtures of these active hydrogen groups, the polyester component described above being reacted with this mixture to produce a polyurethane resin containing free carboxylic acid groups. The free carboxylic acid groups may be neutralized to produce a water-dispersible polyurethane resin.

The polyurethane resin described above can be formulated as a water-dispersed basecoat resin along with a grind resin, a cross-linking agent, thixotropic or rheology control agents, thickeners, pigments, aluminum and/or mica particles, basifying agents, water, fillers, surfactants, stabilizers, plasticizers, wetting agents, dispersing agents, adhesion promoters, defoamers, catalysts, and additional polymers, for example a branch-chain polyester among other ingredients.

After formulation, the basecoat composition can be sprayed or electrostatically deposited onto the automobile body, preferably, in one or two coats. Generally, two even coats of basecoat are applied with a one minute flash between coats. After deposition of the basecoat, before application of a high solids content clear coat, it is generally preferred to flash about 90% of the water from the basecoat for optimum appearance and to eliminate water boil of the clearcoat.

A preferred embodiment of the water-dispersible anionic resin relates to a polyurethane product wherein the polyurethane is formed with a mixture of an excess of diisocyanate, a multi-functional compound having at least one active hydrogen functionality and at least one carboxylic acid, functionality and a hydroxy terminated polyester resin. This mixture produces a urethane-containing resin intermediate having one or two free isocyanate groups per polymer chain. In especially preferred embodiments, the free isocyanate groups are than capped with an excess of an alcohol having a hydroxy functionality of at least one and preferably, two or more.

The polyester component is preferably formed from an alcohol component having at least about 2 hydroxy groups per molecule (polyol) and a carboxylic acid component. The carboxylic acid component is comprised of at least about 50% by weight of a long chain carboxylic acid containing compound having between 18 and 60 carbon atoms in the chain. This long-chain carboxylic acid component is an alkyl, alkylene, aralkyl, aralkylene, or compound of similar hydrophobicity having 18 and 60 carbons in the chain. The polyester chain may be branched, but it is preferred that chain-branching be kept to a minimum. It is recognized that low flash and quick-drying characteristics of the basecoat compositions of this invention are the result of having a high percentage of highly hydrophobic groups in the polyester resin. C18 to C60 carboxylic acid present a range of compounds having suitable hydrophobicity. Most preferably, this long chain carboxylic acid is a dicarboxylic acid and most preferably is a $C_{36}$ dicarboxylic acid known as a dimer acid. The remaining carboxylic acid component may be comprised of a short-chain monocarboxylic or dicarboxylic acid component, preferably a dicarboxylic acid. When monocarboxylic acid compounds are used, these function as polyester chain terminators. Thus, where high molecular weight polyesters are desired, the amount of monocarboxylic acid is kept to a minimum. The short- chain dicarboxylic acid may be preferably short-chain alkyl or alkalyne dicarboxylic acid, for example, azeleic acid, adipic acid, or an equivalent aliphatic dicarboxylic acid or an aromatic dicarboxylic acid. Most preferably, the aromatic dicarboxylic acid is isophthalic acid. It must be stressed that while a number of short-chain carboxylic acid compounds may be used, the ultimate goal is to maintain the hydrophobic, quick-flash characteristics of the polyester resin.

The polyester resins described hereinabove are useful on virtually any elastomeric substrate and are particularly useful when formulated into polyurethane coatings and used in basecoat formulations for deposition onto metal or plastic substrates, especially automobile bodies. The polyurethane resins synthesized from the above-described polyesters exhibit quick-drying, low flash characteristics. These polyurethane resins are, of course, useful in embodiments where quick-drying, low-flash characteristics are required. These resins have shown particular utility as a basecoat in a multi-layer basecoat/clear coat automobile coating system.

The composition of the carboxylic acid component and polyol component employed to synthesize the polyester resins is such as to provide an excess of the polyol over and above the total number of equivalents of acid present in the mixture. In other words, the reactants should be selected, and the stoichiometric proportions of the respective acid and polyol components be adjusted to give hydroxy-terminated, polyester molecules each theoretically having a hydroxyl functionality of 2 or more.

As stated above, the acid mixture employed in forming the polyester intermediate most preferably contains a $C_{36}$ dicarboxylic acid product known as dimer acid. Processes for forming this acid are well known and form the subject of numerous U.S. patents including U.S. Pat. Nos. 2,482,761, 2,793,220, 2,793,221 and 2,995,121 or alternatively dimer fatty acid can be purchased from a chemical supply house (Empol 1010, available from Emery Chemical Co.)

$C_{36}$ dimer fatty acid fraction consists essentially of dimer ($C_{36}$ dicarboxylic acids) together with amounts up to about 20-22% of $C_{54}$ trimer. However, those of skill in the art refer to this dimer-trimer mixture as "dimer", and this practice is followed herein. The preferred grade contains 97% dimer and 3% trimer. These polymerization reaction products can be used in the form in which they are recovered from the polymerization unit, or they can be given a partial or complete hydrogenation treatment to reduce unsaturation before being reacted with the polyol compound to form the polyester. Polyesters so formed can then be used to form a polyurethane resin which can be used in basecoat formulations exhibiting low flash, quick-drying characteristics.

The polyurethanes of the present invention are advantageously storage stable and are, of course, water dispersible. The water dispersibility of the resins is controlled by the amount of free carboxylic acid contained in the final resin particles, and the number of salt groups formed from those free acid groups.

Coating compositions produced using the polyurethane resins described herein have exhibited low flash and quick drying characteristics surprising for a water-dispersible resin.

DETAILED DESCRIPTION OF THE INVENTION

The present invention relates to a water soluble anionic polyurethane resin produced by reacting a polyester component comprised of at least 50% by weight of the carboxylic acid component of a long chain carboxylic acid containing compound with a mixture of a polyisocyanate-containing compound, a multifunctional compound having at least one active hydrogen functionality and at least one carboxylic acid functionality, and optionally, an additional component comprising a compound having at least two active hydrogen containing moieties. The resulting polyurethane intermediate has terminal isocyanate groups or active hydrogen-containing moieties, depending upon the stoichiometry of the polyester mixture described above.

An especially preferred embodiment of the polyurethane resins of the present invention relates to the formation of a urethane product in which the intermediate polyurethane resin described above has free isocyanate groups at the terminal positions of the polyurethane resin. The isocyanate groups are then capped with an excess of a polyfunctional alcohol having at least 2 alcohol groups, and preferably at least 3 alcohol groups.

The particular characteristics of the polyurethane resins are determined by the components of the polyester resin. It has unexpectedly been discovered that polyester resins produced from a carboxylic acid component comprised of at least about 50% by weight of a long fatty acid or dicarboxylic acid having between about 18 and 60 carbon atoms can be formulated into water-dispersible polyurethane coating resins exhibiting particularly favorable low flash and quick drying properties for water borne basecoat resins.

The acid component of the polyester is, of course, critical to the invention and is comprised of a mixture of at least about 50% by weight of a long chain carboxylic acid component having between 18 and 60 carbon atoms. Preferably, the long chain carboxylic acid is a dicarboxylic acid and most preferably, the dicarboxylic acid is a $C_{36}$ dimeric dicarboxylic acid or dimer acid. Where the long chain carboxylic acid comprises less than 100% of the carboxylic acid component, the carboxylic acid component is also comprised of one or more short-chained carboxylic acids.

Preferably, the long chain fatty acid comprises between about 50 and 80% by weight of the acid component of the polyester polyol. In the principal resin (major vehicle) the long chain fatty acid component comprises about 75–80% of the a long chain fatty acid component and in the grind resin, the polyester resin comprises about 50% by weight of the polyester resin. Generally, the higher the percentage of long chain carboxylic acid, the better the quick-drying or flash off characteristics of the final polyurethane resin. However, the advantageous flash-off characteristics must be balanced with the effect that the change in the carboxylic acid component has on the metallic effects, durability and other characteristics of the resin, including, in the case of grind resin, the ability to accomodate pigment.

The shorter chain carboxylic acid component is comprised of a mono-, di- or higher functionality carboxylic acid or a mixture of these carboxylic acids having carbon chains of 12 or fewer carbon units. Monocarboxylic acids function to terminate a polyester and are chosen for that purpose. It is preferable that the short chain carboxylic acid component be a dicarboxylic acid. Such preferred dicarboxylic acid compounds include, for example, adipic, azeleic, and other aliphatic dicarboxylic acids. Aromatic dicarboxylic acids may also be preferred. As especially preferred aromatic dicarboxylic acid is isophthalic acid. Alkylene and aralkylene carboxylic acids can also be used. Where branch chains in the polyester are desired, a carboxylic acid containing three or more carboxylic acid groups, for example citric acid, is used. A preferred acid of this type is trimellitic anhydride.

The polyester resins are synthesized from the above-described carboxylic acid component and an excess of a polyol component. An excess of polyol is used so that the polyester resin preferably contains terminal hydroxyl groups. The polyol compounds preferably have an average hydroxy-functionality of at least 2.

The polyester resin in most cases is comprised of one or more polyols, preferably a diol. Up to about 25 percent by weight of the polyol component may be a polyol having three or more hydroxy groups per molecule. Where polyols having three or more hydroxy groups are chosen, the result is a branched polyester.

While it is not always desirable to have a triol or higher multi-functional alcohol present because of the tendency to form a branched chain polyester, some branching may be desirable. The polyester resin should not be highly branched, however. There may also be present a small amount of monoalcohol, in the polyol component, particularly if larger proportions of higher functional alcohols are used. These monoalcohols serve as chain terminators. In certain instances, for example, where certain high molecular weight polyols are used, the polyols can be largely or even entirely made up of compounds of functionality greater than two.

The diols which are usually employed in making the polyester resins include alkylene glycols, such as ethylene glycol, propylene glycol, butylene glycol, and neopentyl glycol, 1,6 hexanediol and other glycols such as hydrogenated bisphenol A, cyclohexane dimethanol, caprolactone diol (i.e., the reaction product of caprolactone and ethylene glycol), hydroxyalkylated bisphenols, and the like. However, other diols of various types and, as indicated, polyols of higher functionality may also be utilized. Such higher functional alcohols can include, for example, trimethylolpropane, trimethylolethane, pentaerythritol, and the like, as well as higher molecular weight polyols.

The low molecular weight diols which are preferred in the instant invention are known in the art. They have hydroxy values of 200 or above, usually within the range of 2000 to 200. Such materials include aliphatic diols, particularly alkylene polyols containing from 2 to 18 carbon atoms. Examples include ethylene glycol, 1,4-butanediol, cycloaliphatic diols such as 1,2 cyclohexanediol and cyclohexane dimethanol. An especially preferred diol is 1,6 hexanediol.

The resulting polyester resin is preferably produced with dimer fatty acid as the long chain carboxylic acid, isophthalic acid as the minor short-chain carboxylic acid component component and an excess of 1,6 hexane diol so that the resulting polyester polyol ranges in size between about 200 and 2000 grams per equivalent of hydroxyl. Preferably, the polyester resin has a range between 700 and 800 grams per equivalent of hydroxyl and most preferably, has about 750 grams per equivalent of hydroxyl.

To produce the polyurethane resins which are useful in basecoat compositions of the present invention, the above-described polyester polyol is reacted with a mixture of a polyisocyanate, a multi-functional compound having at least one active hydrogen group and at least one carboxylic acid group, and optionally, a component comprising a chemical compound having at least two active hydrogen groups, but no carboxylic acid groups.

The polyester, polyisocyanate and multi-functional compound may also be reacted in the same pot, or may be reacted sequentially, depending upon the desired results. Sequential reaction produces resins which are more ordered in structure. Both the polyester and multi-functional compound may serve as chain extenders to build up the polyurethane backbone through reaction of hydroxyl groups with isocyanate groups. However, to function as a chain extender, the multi-functional compound must have at least two active hydrogen groups. Where the multi-functional compound has only one active hydrogen group, the result is chain termination. Additional chain extenders having at least two active hydrogen groups but no carboxylic acid groups may be added to increase the chain length or to change the chemical characteristics of the polyurethane resin. In general, an excess of polyisocyanate is used so that an intermediate polyurethane resin can be produced having free isocyanate groups at the terminal ends. The free isocyanate groups may then be preferably capped with trimethylol propane or diethanolamine.

The organic polyisocyanate which is reacted with the polyhydric material as described is essentially any polyisocyanate and is preferably a diisocyanate, e.g., hydrocarbon diisocyanates or substituted hydrocarbon diisocyanates. Many such organic diisocyanates are known in the art, including p-phenylene diisocyanate, biphenyl 4,4′diisocyanate, toluene diisocyanate, 3,3′-dimethyl-4,4 biphenylene diisocyanate, 1,4-tetramethylene diisocyanate, 1,6-hexamethylene diisocyanate, 2,2,4-trimethylhexane-1,6 diisocyanate, methylene bis (phenyl isocyanate), 1,5 naphthalene diisocyanate, bis (isocyanatoethyl fumarate), isophorone diisocyanate (IPDI) and methylene-bis- (4 cyclohexylisocyanate). There can also be employed isocyanateterminated adducts of polyols, such as ethylene glycol, or 1,4-butylene glycol, trimethylolpropane etc. These are formed by reacting more than one mol. of a diisocyanate, such as those mentioned, with one mol. of polyol to form a longer chain diisocyanate. Alternatively, the polyol can be added along with the diisocyanate.

While diisocyanates are preferred, other multifunctional isocyanates may be utilized. Examples are 1,2,4-benzene triisocyanate and polymethylene polyphenyl isocyanate.

It is preferred to employ an aliphatic diisocyanate, since it has been found that these provide better color stability in the finished coating. Examples include 1,6-hexamethylene diisocyanate, 1,4-butylene diisocyanate, methylene bis (4-cyclohexyl isocyanate) and isophorone diisocyanate. Mixtures of diisocyanates can also be employed.

The proportions of the diisocyanate, polyester, and multi-functional compound are chosen so as to provide an isocyanate terminated intermediate polyurethane resin. This can be accomplished by utilizing a stoichiometric excess of polyisocyanate, i.e., more than one isocyanate group per nucleophilic moiety (reactive with isocyanate) in the other components.

For purposes of promoting water-solubility it is important to build acid groups into the polyurethane. For example, the presence of acid groups is capable of rendering the composition water-dilutable.

The acids that are employed to provide free acid groups in the polyurethane resins of this invention are readily available. They contain at least one active hydrogen group and at least one carboxylic acid functionality. The active hydrogen group may be a thiol, a hydroxyl or an amine, with primary amines being considered to have one active hydrogen group. Examples of such compounds include hydroxyl carboxylic acids, amino acids, thiol acids, aminothiol acids, alkanolamino acids, and hydroxythiol acids.

Compounds containing at least 2 hydroxyl groups and at least one carboxylic acid are preferred. They can be prepared from an aldehyde that contains at least two hydrogens in the alpha position. Such aldehydes are reacted in the presence of a base catalyst with two equivalents of formaldehyde to form an 2.2-hydroxymethyl aldehyde. The aldehyde is then gently oxidized to the acid by known procedures. The acids that are employed in the invention can be represented in simplification by Formula I:

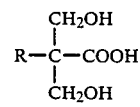

wherein R represents hydroxymethyl, hydrogen, or alkyl of up to 20 carbon atoms and preferably up to 8 carbon atoms.

Specific illustrative examples of such acids that are employed in the invention include 2,2-di(hydroxymethyl) acetic acid, 2,2,2-tri(hydroxymethyl) acetic acid, 2,2-di(hydroxymethyl) propionic acid, 2,2-di (hydroxymethyl) butyric acid, 2,2-di(hydroxymehtyl) pentanoic acid, and the like. The preferred acid is 2,2-di(hydroxymethyl) propionic acid.

Longer-chain polyurethane resins can be obtained by chain extending the polyurethane chain with a compound or mixture of compounds containing at least two active hydrogen groups but having no carboxylic acid group, for example diols, dithiols, diamines, or compounds having a mixture of hydroxyl, thiol, and amine groups, for example, alkanolamines, aminoalkyl mercaptans, and hydroxyalkyl mercaptans, among others. For purposes of this aspect of the invention both primary and secondary amine groups are considered as having one active hydrogen. Alkanolamines, for example, ethanolamine or diethanolamine, are preferably used as chain extenders, and most preferably a diol is used. Examples of preferred diols which are used as polyurethane chain extenders include 1,6 hexane diol, cyclohexanedimethylol, and 1,4-butanediol. A particularly preferred diol is neopentylglycol. Of course, the same diols used to synthesize the polyester component of the polyurethane resins can be utilized here as well. While polyhydroxy compounds containing at least three hydroxyl groups may be used as chain extenders, the use of these produces branched polyurethane resins. For purposes of the present invention, it is preferred to minimize the amount of branching in the polyurethane resin. Therefore, if polyhydroxy compounds are used, they are preferably limited to a very minor component of the polyurethane producing mixture. These higher functional polyhydroxy compounds include, for example, trimethylolpropane, trimethylolethane, pentaerythritol, among other compounds.

The polyurethane resin may be chain extended in any manner using these compounds having at least two active hydrogen groups. Thus, these compounds may be added to the mixture of polyisocyanate, polyester and multi-functional compound, or alternatively, may react at an intermediate stage, to link two free isocyanate groups that are present at the terminal ends of an intermediate polyurethane resin.

It is generally preferred that an intermediate polyurethane resin produced by reacting the polyester resin and the mixture of polyisocyanate, multifunctional compound containing at least 2 hydroxyl groups and one carboxylic acid group, and chain extender be terminated with free isocyanate groups. To accomplish this, an excess of the polyisocyanate component is used. Of course, the molar ratio of the other components will be adjusted according to the desired characteristics of the intermediate and final polyurethane resins. The polyester component comprises no more than about 80% by weight of the reaction mixture and it is preferred that the polyester component comprises from about 20% to about 70% by weight of reactants in the mixture.

In one especially desirable embodiment of the invention, a multi-functional alcohol is used to terminate the reaction (cap the free isocyanate groups) at the desired stage (determined by the viscosity and isocyanate groups present), thereby also contributing residual hydroxyl groups. Particularly desirable for such purposes are aminoalcohols, such as ethanolamine, diethanolamine and the like, since the amino groups preferentially react with the isocyanate groups present. Multi-functional alcohols, such as ethylene glycol, trimethylolpropane and hydroxyl-terminated polyesters, can also be employed in this manner.

While the ratios of the components of the polyester, the multi-functional isocyanate and the terminating agent can be varied, it will be noted by those skilled in the art that the amounts should be chosen so as to avoid gellation and to produce an ungelled, urethane reaction product containing hydroxyl groups. The hydroxyl value of the urethane reaction product should be at least 5 and preferably about 20 to about 200.

The amount of polyisocyanate used in the mixture is preferably between about 20% and 30% by weight of the reactants in the mixture, but will vary depending upon the polyester used, the acid number of the final polyurethane resin, and the desired molecular weight of the final polyurethane resin. The amount of polyisocyanate will also vary depending upon whether it is desired to have the intermediate polyurethane terminated with free isocyanate groups or with hydroxyl groups. Thus, where it is preferred to terminate the intermediate polyurethane resin with free isocyanates for capping with trimethylolpropane or diethanolamine, an excess of polyisocyanate may be used. Where the intermediate polyurethane resin is to be terminated by hydroxyl groups, a stoichiometric deficiency of polyisocyanate may be used.

The amount of multi-functional component having at least one active hydrogen group and at least one carboxylic acid group also may vary depending upon the desired acid number of the final polyurethane resin. The final polyurethane resin has an acid number of at least about 10, and the amount of this multi-functional component comprises between about 1% and about 25% by weight of the reactants of polyurethane producing reaction mixture (polyisocyanate, polyester, multifunctional compound, and optionally other chain extenders, for example compounds having two active hydrogens but no carboxylic groups). It is preferable that the acid number be higher, because as the acid number increases, the water-dispersibility of the polyurethane resin potentially increases. The practical upper limit of acid number is that which negatively effects the low flash or quick-drying characteristics and physical properties of the final resin. Of course, the upper limit of the acid number will vary depending upon the chemical composition of the final polyurethane resin, but an acid number with an upper limit of about 100 is, in general, the practical limit of polyurethane resins of the present invention.

The amount of chain extender, when used producing the polyurethane resin, varies between about 2% and 25% by weight of the reactants. The amount used will depend upon the amount of chain extension desired and the desired size of a polyurethane molecule.

After the polyurethane resin is synthesized, the free carboxylic acid groups are neutralized with base to form salt groups. Preferably, the base is an amino containing compound. Tertiary amines are generally preferred over primary and secondary amines because of the tendency of the primary and secondary amines to react with aminoplast cross-linking agents. Preferred tertiary amines include tri-alkylamines, for example, trimethyl and triethylamine. Also preferred is triethanolamine. Particularly preferred is dimethylethanolamine.

The polyurethane resins of the present invention are formulated, along with other components, into water dispersible basecoat compositions which are sprayed or electrostatically deposited onto metal or plastic substrates, for example, automobile bodies. In general, a polyurethane resin formulated as described herein, is mixed with an aminoplast resin, pigments a grind resin, water, a portion of an organic solvent, aluminum and/or mica particles and a rheology control agent. Other agents may be included, for example, various fillers, surfactants, plasticizers, stabilizers, wetting agents, dispersing agents, defoamers, adhesion promoters and catalysts in minor amounts. In one preferred embodiment a branched-chain polyester component is also added to the basecoat composition.

As indicated, an aqueous dispersion of the polyurethane resin is utilized as the principal or major vehicle resin. In general, the principal or major vehicle resin comprises between about 20 and 80% by weight of the total solids present in the basecoat composition. The preferred polyurethane resin is a resin produced from a polyester synthesized from dimer fatty acid, isophthalic acid, and 1,6 hexanediol. The resulting polyester is then reacted with a diisocyanate of isophorone, dimethylol propionic acid and a diol, for example, neopentyl glycol. The resulting polyurethane intermediate having free isocyanate groups is then reacted with trimethylolpropane to cap these groups.

The polyurethane reaction product as described above is mixed with an aminoplast resin. Aminoplast resins are aldehyde condensation products of melamine, urea, and similar compounds. Products obtained from the reaction of formaldehyde with melamine, urea or benzoguanamine are most common and are preferred herein. However, condensation products of other amines and amides can also be employed, for example, aldehyde condensates of triazines, diazines, triazoles, guanidines, guanamines and alkyl and aryl substituted derivatives of such compounds, including alkyl and aryl substituted ureas and alkyl and aryl substituted melamines. Some examples of such compounds are N,N'-dimethylurea, benzourea, dicyandiamide, formoguanamine acetoguanamine, ammeline, 2-chloro-4,6-diamino-1,3,5-triazine, 6-methyl-2,4-diamino,1,3,5-triazine, 3-5-diamino-triazole, triaminopyrimidine, 2-mercapto-4,6-diaminopyrmidine, 2,4,6-triethyl triamino-1,3,5-triazine, and the like.

While the aldehyde employed is most often formaldehyde, other similar condensation products can be made from other aldehydes, for example, acetaldehyde, crotonaldehyde acrolein, benzaldehyde, furfural, and others.

The amine-aldehyde condensation products contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohols, for example, cyclohexanol, monoethers or glycols such as Cellosolves and Carbitols TM (Union Carbide), and halogen-substituted or other substituted alcohols, such as 3-chloropropanol. The preferred amine-aldehyde resins are etherified with methanol or butanol.

A grind resin is also used in the basecoat compositions of the present invention. While the pigment resin may be comprised of a number of water soluble polyurethane resins, it is preferred that the grind resin be similar in chemical character to the principal or major vehicle resin, i.e., contain a polyester resin component comprised of a carboxylic acid component comprised of at least about 50% by weight of a C18 to C60 carboxylic acid, preferably a dicarboxylic acid. The grind resin may range between about 2 and about 75% by weight of the total solids in the coating composition and will vary depending on the desired color and preferably comprises about 5–40% by weight of the basecoat composition.

A preferred anionic polyurethane resin for use as a grind resin in embodiments of this invention is produced from a polyester polyol synthesized from dimer fatty acid, adipic acid, and 1,6-hexane diol. The resulting polyester diol is reacted with isophorone diisocyanate, dimethylol propionic acid and neopentyl glycol to produce a polyurethane intermediate which is capped with diethanolamine.

Pigments may be incorporated into the basecoat to provide the desired cosmetic characteristics. This is done by mixing pigments with the above-described pigment resin and optionally, with other additives to form a pigment paste. Any standard pigment known in the art may be used with resins of the present invention so long as these pigments can be formulated without affecting the desired low flash and quick-drying characteristics. Specific examples of the dye stuffs or pigments may be inorganic or organic, for example, graphite, carbon black, zinc chromate, strontium chromate, barium chromate, lead chromate, lead cyanide, titanium dioxide, zinc oxide, cadmium sulfide, iron oxide, aluminum flakes mica flakes, zinc sulfide, phthalo cyanine complexes, naphthol red, quinacridones and halogenated thioindigo pigments, among others.

The preferred metallic pigments are metal powders preferably mixed with aluminum metal flakes. Preferred aluminum flake pigments are available from Silberline Corp, Lansford, Pennsylvania or from Eckart Werke, Guenterstahl, West Germany. The aluminum flake pigments provide the coating with an enhanced "metallic veneer". In a preferred embodiment of the present invention standard grade aluminum stabilized with phosphate ester is used. Other metallic flake pigments, for example, silver may also be used but these are usually prohibitive in cost and inferior in appearance. The metallic pigments may also be mixed with non-metallic pigments, but these are to be carefully chosen so as not to diminish the desired metallic effect.

The resins used in the basecoat are dispersed in deionized water. It is preferred that the deionized water have conductance readings of less than 13 microohms$^{-1}$ and most preferably less than about 5 microohms$^{-1}$ to prevent gassing caused by the reaction of aluminum with water. Deionized water is also chosen to avoid salts that naturally occur in tap water. Other solvents may also be employed with the deionized water. An especially preferred solvent is Butyl Cellosolve TM which aids mixing, formulating and dispersing pigment in the basecoat composition. Other solvents can also be used, for example, low-boiling mono and polyhydric alcohols, ethers, esters, ketones and other organics. The organic solvent, which comprises at most about 80% of the basecoat composition, and preferably comprises about 10% to 20% by weight of the basecoat composition (including water) may be selected to promote the dispersibility of individual components in the final basecoat composition (plasticizer characteristics) and for its low volatitity characterisitics.

A rheology control agent is also preferably incorporated into the basecoat composition. The rheology control agent controls the viscosity of the resulting composition and is incorporated in amounts that will prevent sagging or running after a basecoat is sprayed onto a vertical surface such as an automobile body. The direct result of incorporating a rheology control agent is to provide flow control, body and sprayability. Other favorable results of adding a rheology control agent are to enhance the flip effect of metallic flake pigments, to deposit a thicker coating, and to achieve complete coverage of a substrate. The sprayed coatings containing these agents also exhibit greater orientation of the metallic flake pigments on the final coated substrate. Rheology control agents which can be used in embodiments of the present invention include the fumed silica compounds and the bentonite clays. Preferred fumed silica compounds are the hydrophobic silica compounds, for example Aerosil R972, available from DeGussa Corporation, (Frankfurt, West Germany). Another rheology control agent which may be used, and in certain basecoat compositions, may be preferred is a synthetic sodium lithium magnesium silicate hectorite clay. An example of one such clay is Laponite RD, available from Laporte, Inc (Saddlebrook, N.J.). In certain preferred embodiments rheology control agents are mixed. The rheology control agent when it is included, generally comprises about 0.1 to about 20 percent by weight of the basecoat composition and preferably comprises between about 1 percent and about 5 percent by weight of the final basecoat composition.

In general, the particle size of the rheology control agent plays a role in the overall thixotropic properties of these resins. Rheology control agents in embodiments of this invention are suspended in the material. It may be proposed that the rheology control agents are suspended and function, at least in part, through coulombic or electrostatic interactions.

In general, the particle sizes can be from less than 0.1 microns to over about 200 microns. These sizes can be adapted to develop in part the rheology properties sought. In appropriate circumstances, the particle sizes may be from about 0.01 to about 10 microns.

In addition to a principal resin or major vehicle resin and a grind resin, peferred basecoat compositions also are comprised of at least about 5% by weight of the resinous vehicle of a branched-chain polyester resin. The branched-chain polyester is added for improved application properties and improved physical properties (due to increased cross-link density). In general, the branched-chain polyester is produced from the same components as the polyester component except that in addition to the long and short chain carboxylic acid components, a small percentage of trifunctional acid or acid anhydride is used. Thus, the carboxylic acid component of the branch-chain polyester is comprised of at least 50% by weight of a long-chain fatty acid, preferably C36 dimer fatty acid and no more than about 50% by weight of a combination of a dicarboxylic acid such as isophthalic acid and a small percentage of a trifunctional carboxylic acid such as trimellitic anhydride. In preferred embodiments, the branched chain polyester is synthesized from dimer fatty acid, isophthalic acid, and 1,6-hexane diol. A small percentage, about 5 to about 20% of trimellitic anhydride is added to the polyesterification reaction to branch the polyester. The branched chain polyester is cooked to a final acid number of 10-50, and preferably, 20-40. In general, the branched polyester comprises about 20% of the resinous vehicle, but may be lower depending on the color.

Any additional agent used, for example, surfactants, fillers, stabilizers, wetting agents, dispersing agents, adhesion promoters, etc. may be incorporated into the basecoat composition. While the agents are well-known in the prior art, the amount used must be carefully controlled to avoid adversely affecting the coating and quick-drying characterisitcs.

In formulating the basecoat compositions of the present invention, the order of addition of the individual components is often very important. As a rule, the cross-linking agent in a solvent is added to the rheology control agent in solution and thoroughly mixed. Thereafter, the major vehicle resin dispersion (neutralized with amine) is added to the rheology control solution under agitation. If desired, a slurry of aluminum metal flakes and/or mica particles (mica particles are used alone in the case where an aluminum metallic veneer is not desired) in Butyl Cellosolve ™ is mixed with a premixed slurry of a branched-chain polyester resin and dimethylethanolamine. This mixture of aluminum is then agitated with the slurry containing resinous vehicle, cross-linking agent, and rheology control agent. Pigment pastes comprised of polyurethane resin, pigment, fillers, stabilizers, plasticizers and other additives are then mixed under agitation with the above-resulting mixture. Pigment paste particles are prepared in a sand mill, attritor or other common milling equipment prior to use.

The pigment pastes may be prepared by mixing the aminoplast resin with about ¼ of the total polyurethane resin to be added to the pigment paste. Pigment is added to this slurry under agitation for about ½ hour. The rest of the polyurethane resin is then added and the resulting paste is mixed for another half-hour. The pH and viscosity of the paste is checked and any adjustments are made by adding deionized water and/or tertiary amine. The weight ratio of pigment to binder usually ranges between 0.15-5.0. The amount of pigment ranges between 6 and 60% of the total weight of pigment plus binder. Other well-known methods of formulating prepared pigment pastes may also be used.

The final basecoat composition is adjusted to a pH of 7.6-7.8 with a tertiary amine, for example, N-ethylmorpholine. Viscosity may be adjusted using deionized water. Final basecoat compositions are comprised of the following components in the indicated weight ratios.

TABLE I

| Ingredient | Amount (% by weight of Solids of Final Basecoat composition) |
|---|---|
| Polyurethane resin | 20–80% |
| Melamine | 5–50% |
| Rheology Control Agent | 0–20% |
| Branched chain Polyester | 0–35% |

TABLE I-continued

| Ingredient | Amount (% by weight of Solids of Final Basecoat composition) |
|---|---|
| Pigment | 2–65% |

The basecoat compositions described hereinabove can be applied to a metal or plastic substrate in one or two coats using for example an air atomizer (Binks Model 60 spray gun, available from Binks Manufacturing Corporation, (Franklin Park, Ill.), or by using other conventional spraying means. The basecoat compositions may also be applied electrostatically. The basecoat compositions are preferably sprayed at 50-80 psi, and a relative humidity of between 50 and 90% (optimally at 60-80% relative humidity) and a temperature of 70°-90° F.

After being deposited, the basecoat compositions are flash dried within a temperature range of about room temperature to about 145 degrees F. for between 30 seconds and about 10 minutes using warm air blowing at a relative humidity of 5-40%. The preferred flash temperature is about 120 degrees F. which is carried out for preferably between about 1 and 5 minutes. The flash conditions described herein result in about 90-95% of the solvents (water plus organics) being flashed from the basecoat in this short period of time.

After the first basecoat is deposited, a second basecoat can be deposited over the first without drying (flash off), or alternatively, a clearcoat may be deposited over the flashed basecoat. Any number of clearcoat compositions known in the art may be used. Any known unpigmented or other transparently pigmented coating agent is in principle, suitable for use as a clearcoat. A typical top coat composition contains 30-70% film forming resin and 30-70% volatile organic solvent.

After the clear coat is coated onto the basecoat layer, the multi-layer coating is then baked to cross-link the polymeric vehicle and to drive the small amount of residual water and organic solvent from the multi-layered polymeric composition. A preferred baking step involves heating the coated substrate for a period of 10-60 minutes at a temperature of between 150 and 300 degrees F. The baking step cures the coating to a hard, durable film.

The invention will be further described in connection with several examples which follow. These examples are shown by way of illustration of the invention and are not meant to limit the scope of the invention. All parts and percentages in the examples are by weight unless otherwise indicated.

POLYURETHANE EXAMPLE 1

Preparation of a Polyurethane Resin

A polyester polyol resin is prepared by charging a reaction vessel (flask with a fractionating column) with 551.9 g. (15.8% of the polyester resin) of isophthalic acid, 1923 g. (54.9%) Empol 1010 (dimer fatty acid available from Emery Chemical Co.), and 1025.1 g. (29.3%) of 1,6-hexanediol and 100 g. of toluene. Additional toluene may be added to fill the trap. The mixture was heated under nitrogen and the water of concondensation was removed. During this heating 235.7 g. of water was distilled off. Heating was continued at approximately 200 degrees C. until the acid number is less than or equal to 8. The remaining toluene is then vacuum stripped at 220° C. to produce a polyester resin for use in the polyurethane resin.

At this point, 697.9 g. of the above-synthesized polyester resin 43.0 g. of dimethylol propionic acid, 16.1 g. of neopentylglycol, 234.0 lbs. of Isophorone diisocyanate and 300 g. of methyl isobutyl ketone are charged to a the reactor and heated at reflux (about 128 degrees C.) until a constant isocyanate value is obtained. 36.8 g. of trimethylol propane is then added to the reactor and the batch is allowed to reflux for an additional one hour. At this point, the nitrogen purge is turned off and the batch is cooled to 95 degrees C. 28.6 g. of dimethylethanolamine and 100 lbs of water is then added using a portion of the water as a rinse. The batch is then allowed to sit until it becomes homogeneous (about 5 minutes) and then 2048.71 g. of water is added over a 20 minute period under vigorous agitation.

At the end of this addition the mixture is distilled on high heat with vigorous agitation to remove water and methyl isobutyl ketone. The water is then returned to the batch and the approximately 300 grams of methyl isobutyl ketone which was distilled off is discarded. 238 g. of n-butanol is added and the batch is held at 80 degrees C. for 30 minutes. The batch is then dropped and filtered through a 10 micron filter to give a polyester-urethane vehicle for use in the basecoat composition of the invention. The resulting dispersion has a solids content of 30% and a Gardner viscosity of Z2.

Polyurethane Dispersion 2

Preparation of Polyester Resin

A reaction vessel is charged with 1995 g. of adipic acid, 1995 g. of dimer acid, and 2450 g. of 1,6-hexanediol, and 136 g. toluene. The mixture is heated under nitrogen to 209 degrees C., removing water until an acid number less than 8 is reached. Remaining toluene is vacuum stripped to produce a polyester resin having solids content greater than 98%.

Polyurethane Dispersion Preparation 857.4 g. of the above polyester is mixed with 14.6 g. neopentyl glycol, 53.1 g. dimethylolpropionic acid, 306.5 g. isophorone diioscyanate, 97.1 g. methyl ethyl ketone, and 235.0 g. methyl amyl ketone are refluxed until a constant isocyanate value is obtained. At this point, 24.8 g. of diethanolamine is added and the mixture is held for 30 minutes. 24.8 g. of dimethylethanolamine and 116.8 g. deionized water and 118.2 g. isopropyl alcohol are added and allowed to mix for 15 minutes. 3123.2 g. deionized water is then added over a 20 minute period with vigorous agitation. The resulting dispersion has a solids content of 26% and an appropriate Gardner viscosity.

Polyurethane Dispersion 3

Preparation of Polyester 770 g. dimer acid, 230 g. 1,6-hexanediol, and 25 g. toluene are charged and the resulting mixture heated to 200 degrees C. Heating is continued, removing water, until an acid number less than 10 is achieved. The remaining toluene is then removed under vacuum.

Polyurethane 700 g. polyester above, 12.6 g. neopentyl glycol, 43 g. dimethylolpropionic acid, 244 g. isophorone diisocyanate, 77.8 g. methyl ethyl ketone, and 195.3 methyl amyl ketone are reacted using the procedure for polyurethane dispersion 2. The resulting dispersion has a solids content of 26% and a Gardner viscosity of Z1.

Branched Polyester 1

2594 g. of dimer acid, 2564 g. of 1,6-hexanediol, and 744 g. of isophthalic acid are charged and the mixture heated to 195 degrees C. under nitrogen with agitation until acid number of 10 or less is reached. The mixture is then cooled to 150 degrees C. and 1000 g. of trimellitic anhydride is added slowly, and refluxed until an acid number of 30-32 is reached. After cooling to 150 degrees C. or less, 729 g. of butyl Cellosolve TM and 1459 g. of n-butanol are added. The resulting polyester has a solids content of 70% and a Gardner viscosity of U-V.

Branched Polyester 2

1230 g. dimer acid and 769.5 g. 1,6 hexanediol, are charged and heated to 195 degrees C. under nitrogen with agitation. Heating is continued until an acid number less than 10 is reached. The mixture is then cooled to 150 degrees C. and 420.1 g. trimellitic anhydride is added slowly and heated until the acid number falls below 30. 335 g. butyl glycol and 670 g. n-butanol are then added with agitation. The resulting polyester solution has a solids content of 70% and a Gardner viscosity of Z1.

Branched Polyester 3

868.7 g. 1,6 hexanediol, 1346.2 g. dimer acid, and 386 g. isophthalic acid are heated at 195 degrees C. until an acid number less than 8 is achieved. 206.6 g. trimellitic anhydride is then added slowly under agitation and heat applied until an acid number less than 30 is achieved. A 2:1 mixture of n-butanol and butyl glycol are then added, until 70% solids is reached. The resulting branched polyester resin had a Gardner viscosity of U.

PREPARATION OF COATING AGENTS

The composition of the coating agents is shown in Table 2, where the numbers denote parts by weight. The following notes refer to components listed there:

Thickener 1: Paste of Aerosil R972 (Degussa) hydrophobic fumed silica sand milled with appropriate polyurethane grind resin and melamine in water, organic solvent mixture at 11% strength.

Thickener 2: Paste of synthetic sodium lithium magnesium silicate hectorite clay, Laponite RD (Laporte), 2% strength is deionized water; the paste is prepared by stirring with Cowles blade in water for one hour.

Thickener 3: Paste of Laponite RD 3% strength in deionized water. Prepare as Thickener 2.

Titanium Dioxide Pigment Paste: 41% concentration of DuPont R-960 titanium dioxide sandmilled with appropriate polyurethane grind resin and melamine.

Melamine Resin: Commercially available methanoletherfied melamine/formaldehyde resin, solids content 90% by weight in n-butanol.

Aluminum Pigment I: Silberline SS-5251 AR post treated with 4.5% Vircopet 40 (phosphate ester commercially available from Albright & Wilson, Richmond, Va.)

Aluminum Pigment II: Stapa Hydrolac WH-R607 from Eckart Werke

Aluminum Pigment III: Stapa Hydrolac WH-8487 from Eckwart Werke

| | 1 | 2 | 3 | 4 | 5 | 6 | 7 | 8 | 9 |
|---|---|---|---|---|---|---|---|---|---|
| Thickener 2 | 40 | 37 | | 37 | 38 | | | | |
| Thickener 3 | | | 25 | | | | | 13 | 13 |
| Melamine Resin | 4 | 4 | 4 | 4 | 8 | 7 | 4 | 1 | 2 |
| Butyl Cellosolve | 1 | 1 | 1 | 1 | 1 | 2 | | | 1 |
| Polyurethane 1 (30% NV) | 40 | | | 40 | | | | | 18 |
| Polyurethane 2 (26% NV) | | 44 | | | 42 | | 38 | 17 | |
| Polyurethane 3 (26% NV) | | | 44 | | | 38 | | | |
| Aluminum I (54% NV) | 6 | | | 6 | | 6 | | | |
| Aluminum II (65% NV) | | 5 | | | | | | | |
| Aluminum III (65% NV) | | | 5 | | 6 | | | | |
| Butyl Cellosolve | 1 | 1 | 1 | | 4 | 2 | 1 | | |
| Polyester 1 (70%) | 6 | | | | | | 6 | 3 | |
| Polyester 2 (70%) | | | 6 | 6 | | | | | |
| Polyester 3 (70%) | | 6 | | | | | | | |
| Dimethylethanolamine 5% Strength in Water | 2 | 2 | 2 | 2 | 1 | 6 | 6 | 1 | |
| Thickener 1 | | | | | | 27 | 27 | 17 | 17 |
| Titanium Dioxide Paste | | | | | | | | 48 | 49 |
| Deionized Water | | | 12 | 4 | | 12 | 12 | | |

EXAMPLES 1 TO 4

The melamine resin and Butyl Cellosolve are premixed and added to the thickener under agitation. The polyurethane dispersion is then added to this mixture under agitation. An aluminum slurry is made by first mixing the aluminum pigment and butyl cellosolve, then adding the polyester resin, and then finally preneutralizing this slurry with the 5% DMEA solution. The aluminum slurry is then added to the polyurethane/thickener/melamine mixture under agitation.

EXAMPLE 5

Half of the melamine resin and butyl Cellosolve TM are premixed and added to the thickener under agitation. The polyurethane dispersion is then added. An aluminum slurry is made separately by mixing the aluminum pigment, remaining butyl Cellosolve TM and melamine resin. The aluminum slurry is then added under agitation to the rest of the paint. The pH is then adjusted with 5% dimethylethanolamine in water.

EXAMPLE 6

An aluminum slurry is made with aluminum pigment, melamine resin, and Butyl Cellosolve under agitation. The polyurethane dispersion is added to the aluminum slurry. Thickener is then added under agitation. pH is adjusted with 5% DMEA and viscosity is adjusted with deionized water.

EXAMPLE 7

The polyurethane dispersion, melamine resin, and Butyl Cellosolve are mixed with agitation. An aluminum slurry is made as in Example 1 to 5 and added to the first mixture under agitation. The thickener is added under agitation. Viscosity is adjusted with deionized water.

EXAMPLES 8 AND 9

Melamine resin and Butyl Cellosolve are premixed and added under agitation to Thickener 3. The polyurethane dispersion is then added under agitation. In Example 8, the polyester resin is preneutralized with 5% DMEA and then added under agitation. Thickener 1 (R972 paste) is added and then the titanium dioxide paste is added both under agitation.

The invention has been described in detail with particular reference to preferred embodiments thereof, but it will be understood that variations and modifications can be affected within the spirit and scope of the invention and that the scope of the invention is to be determined by the claims appended hereto.

What is claimed is:

1. A basecoat composition suitable for deposition onto metal or plastic comprising:
   (a) about 20 to 80% weight percent based on the final solids content of said basecoat composition of an anionic polyurethane principal resin comprised of the reaction product of:
      (i) a polyester component comprised of the reaction product of a carboxylic acid component with an alcohol having at least two hydroxyl groups wherein said carboxylic acid component is comprised of at least about 50% by weight of at least one long-chain carboxylic acid having between 18 and 60 carbon atoms and at most about 50% of at least one short-chain dicarboxylic acid;
      (ii) a multi-functional compound having at least one active hydrogen and at least one carboxylic acid functionality;
      (iii) a compound having at least 2 active hydrogen groups selected from the group consisting of hydroxyl, sulfhydryl, primary amine, and secondary amine, one of said primary amines accounting for one active hydrogen and;
      (iv) a polyisocyanate;
   (b) about 5 to about 50% by weight of an aminoplast cross-linking resin;
   (c) 5 to about 35 weight percent of a branched chain polyester resin comprised of the reaction product of:
      (i) a polyester component comprised of the reaction product of
         (1) a carboxylic acid component comprised of at least 50% by weight of at least one long chain carboxylic acid containing compound having between 18 and 60 carbons and not more than 50% by weight of at least one short-chain dicarboxylic acid; and
         (2) an alcohol component having an average functionality of at least 2; and
      (ii) 2–25% by weight of a polyfunctional carboxylic acid or acid anhydride, said polyfunctional carboxylic acid or acid anhydride having at least 3 carboxylic acid groups; and
   (d) about 2 to 75 weight percent of a pigment-containing grind resin comprising:
      (i) About 6 to about 60% by weight of said pigment-containing grind resin of a pigment;
      (ii) About 20 to about 75% by weight of said pigment-containing grind resin of a polyurethane resin produced by the reaction product of:
         (1) a polyester resin component produced by the reaction of a carboxylic acid component comprised of at least 50% by weight of a long-chain carboxylic acid having between 18 and 60 carbon atoms and at most about 50% of a short chain dicarboxylic acid and an alcohol having at least 2 hydroxyl groups; and
         (2) a mixture of a multi-functional compound having at least 1 active hydrogen and at least one carboxylic acid functinality, at least one compound having at least two active hydrogen groups, and a polyisocyanate, said carboxylic acid groups being neutralized with an amine; and (iii) About 20% to about 60% by weight of said pigment-containing grind resin of an aminoplast cross-linking agent.

2. The basecoat composition according to claim 1 wherein said polyurethane resin is comprised of $C_{36}$ dimer fatty acid as the long-chain carboxylic acid.

3. The basecoat composition according to claim 2 wherein said long-chain carboxylic acid comprises about 50 to 80% of the carboxylic acid component used to synthesize said polyurethane principal resin.

4. The basecoat composition according to claim 3 wherein said long chain carboxylic acid used to synthesize said polyurethane resin is $C_{36}$ dimer fatty acid.

5. The basecoat composition according to claim 1 wherein said polyfunctional carboxylic acid (d) is trimellitic anhydride.

6. The basecoat composition according to claim 1 wherein said hectorite clay is a purified sodium lithium magnesium silicate.

7. The basecoat composition according to claim 1 wherein said fumed silica compound is Aerosil 972 ™.

8. The basecoat composition according to claim 1 wherein said aminoplast is melamine.

9. A branched chain polyester resin for use in basecoat compositions comprising the reaction product of:
(a) a polyester component comprised of the reaction product of
(i) a carboxylic acid component comprised of at least about 50% by weight of a long-chain carboxylic acid having between 18 and 60 carbons, no more than about 50% by weight of a short-chain dicarboxylic acid; and
(ii) an alcohol component having an average functionality of at least 2; and
(b) between about 2 and 25% by weight of a polyfunctional carboxylic acid or acid anhydride having at least 3 carboxylic acid groups.

10. The polyester resin according to claim 9 wherein said long-chain carboxylic acid is $C_{36}$ dimer fatty acid.

11. The polyester resin according to claim 9 wherein said short-chain dicarboxylic acid is isophthalic acid.

12. The polyester resin according to claim 11 wherein said polyfunctional carboxylic acid is trimellitic anhydride.

13. The polyester resin according to claim 12 wherein said aliphatic diol is 1,6 hexanediol.

14. A multi-layer paint composition comprising:
(a) at least one waterborne basecoat composition comprising:
(i) an anionic polyurethane composition comprised of the reaction product of:
(1) a polyester resin component produced by the reaction of a carboxylic acid component comprised of at least 50% by weight of at least one long-chain carboxylic acid having between 18 and 60 carbon atoms and at most about 50% by weight of a short-chain dicarboxylic acid and an alcohol having at least 2 hydroxyl groups; and
(2) a mixture of at least one multi-functional compound having at least 1 active hydrogen group and at least two active hydrogen groups, and a polyisocyanate, said carboxylic acid groups being neutralized with an amine;
(ii) a cross-linking agent;
(iii) a branched chain polyester resin comprised of the reaction product of:
(1) (A) a polyester component comprised of the reaction product of a carboxylic acid component comprised of at least 50% by weight of a long-chain carboxylic acid having between 18 and 60 carbons, no more than about 50% by weight of a short-chain dicarboxylic acid; and
(B) an alcohol containing compound having an average alcohol functionality of at least 2; and
(2) between about 2 and 25% by weight of a polyfunctional carboxylic acid or acid anhydride having at least 3 carboxylic acid groups;
(iv) a pigment; and
(b) a clear topcoat composition for overcoating said basecoat composition.

15. The composition according to claim 14 wherein said long-chain carboxylic acid is $C_{36}$ dimer fatty acid.

16. The composition according to claim 15 wherein said cross-linking agent is melamine.

17. The composition according to claim 16 wherein said short chain dicarboxylic acid is isophthalic acid.

18. The composition according to claim 14 wherein said compound having at least two active groups is selected from the group consisting of diols, diamines, and dithiols.

19. The composition according to claim 14 wherein said aliphatic diol is 1,6 hexanediol.

20. The composition according to claim 14 wherein said polyfunctional carboxylic acid is trimellitic anhydride.

21. The method according to claim 20 wherein said long-chain carboxylic acid is $C_{36}$ dimer fatty acid.

22. The method according to claim 21 wherein said short-chain dicarboxylic acid is selected from the group consisting of adipic acid and isophthalic acid.

23. The method according to claim 22 wherein said alcohol having at least 2 hydroxyl groups is 1,6-hexanediol.

24. The method according to claim 23 wherein said cross-linking agent is melamine.

25. The method according to claim 24 wherein said rheology control agent is selected form the group consisting of fumed silica compounds, bentonite clays, and hectorite clays.

26. The method according to claim 25 wherein said hectonite clay is a purified sodium lithium magnesium silicate.

27. A method of coating an automobile substrate with a multilayer coating comprising:
(a) applying to the primed substrate old at least one layer of a waterborne coating composition comprised of:
(i) a polyurethane resin obtained from the reaction product of:
(1) a polyester resin component produced by the reaction of a carboxylic acid component comprised of at least 50% by weight of a long-chain carboxylic acid having between 18 and 60 carbon atoms and at most about 50% of a short chain dicarboxylic acid and an alcohol having at least 2 hydroxyl groups; and
(2) a mixture of a multi-functional compound having at least 1 active hydrogen functionality and at least one carboxylic acid functionality, at least one compound having at least two active hydrogen groups, and polyisocyanate, said carboxylic acid groups being neutralized with an amine;
(ii) a cross-linking agent;

(iii) a rheology control agent; and
(iv) a pre-formed branched chain polyester resin comprised of the reaction product of:
  (1) (A) a polyester component comprised of the reaction product of a carboxylic acid component comprised of at least 50% by weight of a long chain carboxylic acid having between 18 and 60 carbons, no more than about 50% by weight of a short-chain dicarboxylic acid and between about 2 and 25% by weight of a polyfunctional carboxylic acid having at least 3 carboxylic acid groups; and
  (B) an alcohol component having an average functionality of at least 2; and
  (2) between about 2 and 25% by weight of a polyfunctional carboxylic acid having at least 3 carboxylic acid groups,
(b) flash drying said basecoats; and
(c) applying at least one layer of a clear topcoat onto said basecoat; and
(d) curing said basecoats and topcoat to a hard, durable film.

28. The method according to claim 27 wherein said long-chain carboxylic acid is $C_{36}$ dimer fatty acid.

29. The method according to claim 28 wherein said short-chain dicarboxylic acid is isophthalic acid.

30. The method according to claim 29 wherein said alcohol having at least 2 hydroxyl groups is 1,6 hexane diol.

31. A multi-coated metal or plastic substrate comprising:
a substrate coated with at least one waterborne basecoat composition comprising:
(a) about 20 to 80% weight percent based on the final solids content of said basecoat composition of a first anionic polyurethane resin comprised of the reaction product of:
  (i) a polyester component with an alcohol having at least two hydroxyl groups wherein said carboxylic acid component is comprised of at least about 50% by weight of a long-chain carboxylic acid having between 18 and 60 carbon atoms and at most about 50% of a short chain dicarboxylic acid:
  (ii) a multi-functional compound having at least 1 active hydrogen functionality and at least one carboxylic acid functionality;
  (iii) a compound having at least 2 active hydrogen groups;
  (iv) a polyisocyanate; and
  (v) an amine-containing compound for neutralizing the free carboxylic acid groups;
(b) about 5 to about 50 weight percent of an aminoplast cross-linking resin;
(c) about 0.1 to about 25 weight percent of a rheology control agent, selected from the group consisting of fumed silica compounds, bentonite clays, and hectorite clays;
(d) about 0 to about 35 weight percent of a branched chain polyester resin comprised of the reaction product of:
  (i) a carboxylic acid component comprised of at least 50% by weight of a long chain carboxylic acid having between 18 and 60 carbons, no more than about 48% by weight of a short-chain dicarboxylic acid and between 2 and 25% by weight of a polyfunctional carboxylic acid or acid anhydride, said polyfunctional carboxylic acid having at least 3 carboxylic acid groups; and
  (ii) an alcohol component having an average functionality of at least 2; and
(e) about 2 to about 75 weight percent of a pigment, each of said basecoat compositions being flash-dried before being coated with a clear topcoating, said basecoat composition and said topcoating being cured to a hard, durable film.

32. The composition according to claim 31 wherein said long chain carboxylic acid is $C_{36}$ dimer fatty acid.

33. The composition according to claim 1 wherein said polyurethane resin is neutralized with an amine.

34. The composition according to claim 33 wherein said amine is a tertiary amine.

35. The composition according to claim 14 wherein said amine is a tertiary amine.

36. The method according to claim 21 wherein said amine is a tertiary amine.

37. The method according to claim 21 wherein said premixed slurry is further comprised of pigment particles.

38. The method according to claim 37 wherein said pigment particles are selected from the group consisting of aluminum metal flakes and pigment coated mica particles in solvent.

39. The method according to claim 27 wherein said amine is a tertiary amine.

40. The method according to claim 27 wherein said first layer composition further comprises a composition selected from the group consisting of aluminum, mica, and mixtures thereof.

41. The method according to claim 27 wherein said first layer composition further comprises a branched polyester resin.

42. The method according to claim 40 wherein said first layer further comprises a branched polyester resin.

43. The method according to claim 31 wherein said amine-containing compound is a tertiary amine-containing compound.

44. The basecoat composition of claim 1, wherein the rheology control agent is selected from the group consisting of fumed silica compounds, bentonite clays, and hectorite clays.

45. The multi-layer paint composition of claim 14 wherein said topcoat composition is applied to the uncured basecoat compositions which have been flash dried at a time and temperature such that the topcoat can be applied without an intervening cooldown period.

46. The multi-layer paint composition of claim 45 wherein the basecoat compositions are flash dried at a temperature between room temperature and about 145 degrees F. for between about 30 seconds and about 10 minutes.

47. The multi-coated metal or plastic substrate of claim 31 wherein the basecoat compositions are flash dried at a time and temperature such that the topcoat can be applied without an intervening cooldown period.

48. The multi-coated metal or plastic substrate of claim 47 wherein the basecoat composition are flash dried at a temperature between room temperature and about 145 degrees F. for between about 30 seconds and about 10 minutes.

49. The basecoat composition of claim 1 additionally comprising from about 2 to about 25 weight percent of a rheology control agent.

50. The basecoat composition of claim 49 wherein the rheology control agent is selected from the group consisting of fumed silica compounds, bentonite clays and hectorite clays.

51. A method of making a waterborne basecoat composition for use in a multi-layer coating comprised of
(A) an anionic polyurethane resin comprised of
  (1) a polyester resin component produced by the reaction of a carboxylic acid component comprised of at least 50% by weight of a long-chain acid having between 18 and 60 carbon atoms and at most about 50% of a short-chain dicarboxylic acid and an alcohol having at least 2 hydroxyl groups; and
  (2) a mixture of at least one multi-functional compound having at least 1 active hydrogen functionality and at least one carboxylic acid functionality, at leat one compound having at least two active hydrogen groups, and a polyisocyanate, said carboxylic acid group being neutralized with an amine,
(B) a crosslinking agent, and
(C) a rheology control agent, comprising the sequential steps of:
  (a) adding the crosslinking agent in solution to the rheology control agent in solution and thoroughly mixing;
  (b) adding an aqueous dispersion of the anionic polyurethane resin under agitation and thoroughly mixing.

52. The method of claim 51 comprising the additional sequential step of (c) adding under agitation and with thourough mixing a premixed slurry comprised of:
  (i) a slurry of mica particles and, optionally, aluminum metal flakes and (ii) a pre-formed branched chain polyester resin dispersion, said polyester resin comprised of the reaction product of:
    (1) (A) a polyester component comprised of the reaction product of a carboxylic acid component comprised of at least 50% by weight of a long chain carboxylic acid having between 18 and 60 carbons, no more than about 50% by weight of a short-chain dicarboxylic acid and between about 2 and 25% by weight of a polyfunctional carboxylic acid having at least 3 carboxylic acid groups; and
    (B) an alcohol component having an average functionality of at least 2; and
    (2) between about 2 and 25% by weight of a polyfunctional carboxylic acid having at least 3 carboxylic acid groups.

53. The method of claim 52 comprising the additional sequential steps of (d) adding under agitation and with thorough mixing a pigment-containing grind resin, and (e) adjusting the pH and viscosity of the mixture so obtained.

54. The method of claim 27 wherein the basecoat compositions are flash dried at a time and temperature such that the topcoat can be applied without an intervening cooldown period.

55. The method of claim 54 wherein the basecoat compositions are flash dried at a temperature between room temperature and about 145 degrees F. for between about 30 seconds and about 10 minutes.

* * * * *